United States Patent
Hurtado et al.

(10) Patent No.: US 10,289,462 B1
(45) Date of Patent: May 14, 2019

(54) SYSTEMS AND METHODS FOR INTEGRATION OF WEBSPHERE OPTIMIZED LOCAL ADAPTERS WITH THE SPRING FRAMEWORK

(71) Applicant: JPMorgan Chase Bank, N.A., New York, NY (US)

(72) Inventors: Camilo Hurtado, Tampa, FL (US); G. Alex Garces, Tampa, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 106 days.

(21) Appl. No.: 15/454,697

(22) Filed: Mar. 9, 2017

Related U.S. Application Data

(60) Provisional application No. 62/307,710, filed on Mar. 14, 2016.

(51) Int. Cl.
*G06F 9/54* (2006.01)

(52) U.S. Cl.
CPC .............. *G06F 9/546* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 6,473,807 B1 * | 10/2002 | Hills | G06F 9/547 707/999.01 |
| 9,871,848 B1 * | 1/2018 | Shanmugam | G06Q 30/00 |
| 2006/0047780 A1 * | 3/2006 | Patnude | H04L 67/42 709/219 |
| 2013/0173684 A1 * | 7/2013 | Kuchhal | G06F 17/30864 709/201 |
| 2014/0207697 A1 * | 7/2014 | Hess von Ludewig | G06Q 10/105 705/320 |

* cited by examiner

*Primary Examiner* — Charles E Anya
(74) *Attorney, Agent, or Firm* — Hunton Andrews Kurth LLP

(57) ABSTRACT

Systems and methods for integration of Websphere Optimized Local Adapters with Spring framework are disclosed. The systems and methods leverages the Spring framework to integrate Wola into a Java application running inside a WebSphere Application Server (WASw) on z/OS. The method for integrating WebSphere Optimized Local Adapters (Wola) with Spring framework include application programming interfaces for the (Wola) with Spring framework to communicate user requests from a web model-view-controller of the Spring framework.

14 Claims, 3 Drawing Sheets

SYSTEMS AND METHODS FOR INTEGRATION OF WEBSPHERE OPTIMIZED LOCAL ADAPTERS WITH THE SPRING FRAMEWORK

RELATED APPLICATIONS

This application claims priority to U.S. Provisional Patent Application Ser. No. 62/307,710 filed Mar. 14, 2016, the disclosure of which is hereby incorporated, by reference, in its entirety.

BACKGROUND OF THE INVENTION

1. Field of the Invention

The present invention generally relates to data processing, and, more specifically, to systems and methods for integration of Websphere Optimized Local Adapters with Spring framework.

2. Description of the Related Art

IBM's WebSphere Optimized Local Adapters ("Wola") product allows Java applications to communicate with Mainframe Customer Information Control System ("CICS") applications. Typically, Wola integrates with Java applications using Enterprise Java Beans ("EJB"). This approach, however, is not suitable for applications which were built using Spring, which is an open source Java framework that provides an alternative to using EJB.

SUMMARY OF THE INVENTION

Systems and methods for integration of Websphere Optimized Local Adapters with spring framework are disclosed. In one embodiment, in an information processing apparatus including at least a memory, a communication interface, and at least one computer processor, a method for integrating WebSphere Optimized Local Adapters (Wola) with Spring framework may include: (1) receiving a user request from a web model-view-controller framework; (2) instantiating and populating a first data object based on the user request; (3) instantiating and populating a second data object with data from the first data object in a byte format; (4) instantiating a record object as an output container; (5) executing a service call to a Wola using the first data object and record object; (6) establishing a connection with the Wola; and (7) receiving the output record from the Wola, the output record populated with data from Wola.

According to one embodiment, the first data object may be a WolaInput data object.

According to one embodiment, the second data object may be a IndexedRecordImpl data object.

According to one embodiment, the method may further include instantiating a third data object that specifies a program to process the user request, wherein the third data object is included in the service call. According to one embodiment, the third data object may be an InteractionSpecImpl object.

According to one embodiment, the method may further include adding a service name to the third data object based on the program.

According to one embodiment, the output record may be an outputRecord object.

According to one embodiment, a system for integrating WebSphere Optimized Local Adapters (Wola) with Spring framework, may include a server comprising at least one computer processor; a memory; a first interface with a web model-view controller framework; and a second interface with a WebSphere Optimized Local Adapter. The at least one computer processor may perform the following: (1) receive a user request from the web model-view-controller framework; (2) instantiate and populate a first data object based on the user request; (3) instantiate and populate a second data object with data from the first data object in a byte format; (4) instantiate a record object as an output container; (5) execute a service call to the Wola using the first data object and record object; (6) establish a connection with the Wola, and (7) receive the output record from the Wola, the output record populated with data from Wola.

According to one embodiment, the first data object may be a WolaInput data object, and the second data object may be a IndexedRecordImpl data object.

According to one embodiment, the computer processor may further also instantiate a third data object that specifies a program to process the user request, wherein the third data object is included in the service call. According to one embodiment, the third data object may be an InteractionSpecImpl object.

According to one embodiment, the computer processor may further add a service name to the third data object based on the program. According to one embodiment, the output record may be an outputRecord object.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

According to one embodiment, systems and methods for integration of Websphere Optimized Local Adapters with spring framework are disclosed. In one embodiment, the system and method may leverage the Spring framework to integrate Wola into the Java application running inside a WebSphere Application Server ("WAS") on z/OS. In embodiments, an object-oriented approach may be used to build the components needed by Wola so that it can connect to a CICS program and exchange data with it without using EJB.

In embodiments, the starting point of the Spring Java to Wola integration is the WolaDao (data access object) or Repository classes. Rather than calling the EJB to adapt the data or message to the CICS, the WolaDao may create its own connection called a CCIConnection to Wola by using the ConnectionSpecConnectionFactoryAdapter. After the connection has been created, the WolaDao may format the data or message into a byte-based data record, which may be accessed by the Wola. Finally, the WolaDao may utilize the CCIDAOSupport abstract class structure to execute a function call to the Wola directly with the byte record. The pathway created bypasses the need to use the conflicting EJBs.

According to embodiments, the solution is more testable and maintainable than EJBs.

Figure 1:
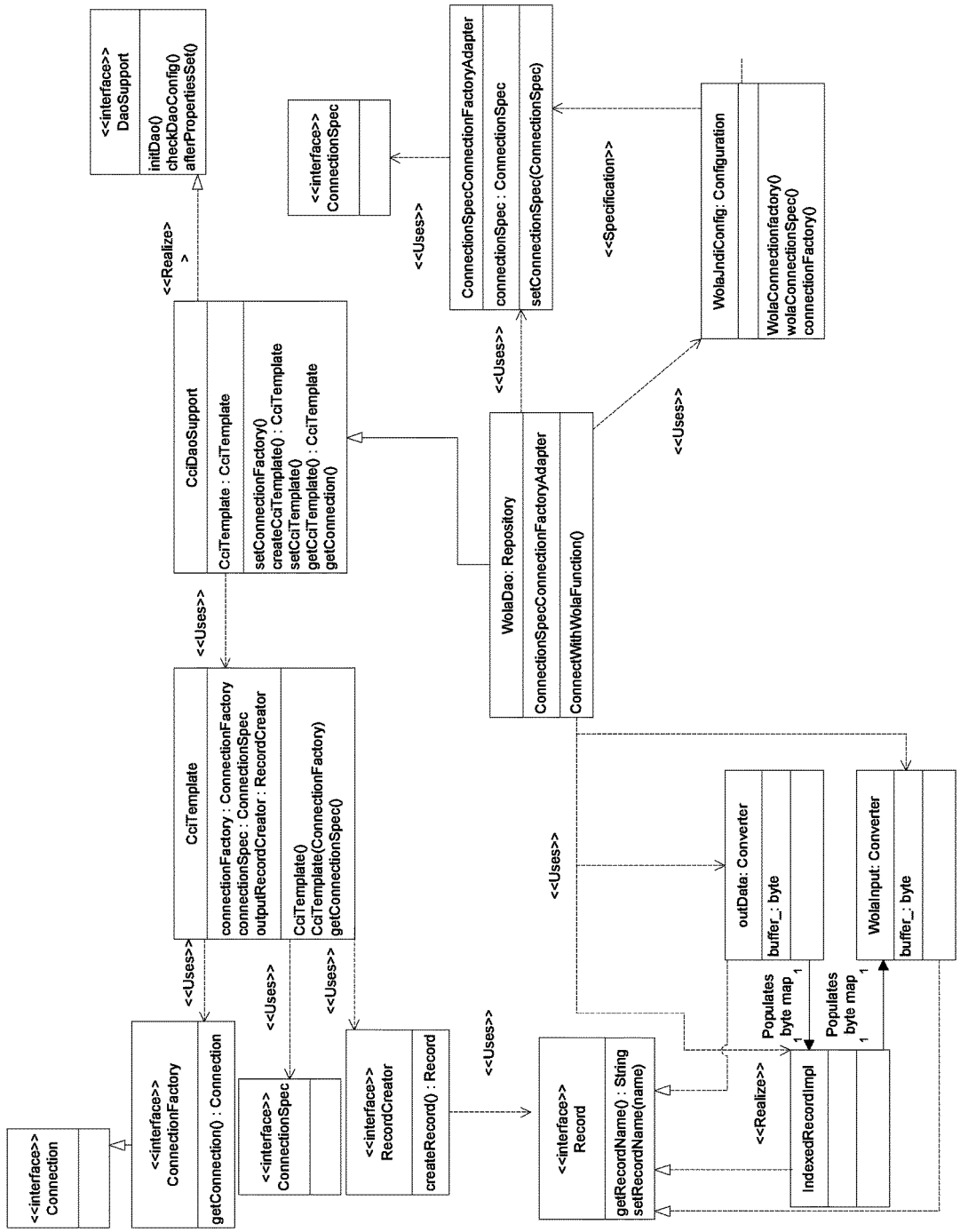
FIG. 1 depicts a unified modeling language (UML) class diagram of a system for Wola integration with Spring framework according to one embodiment.

Referring to FIG. 1, a unified modeling language (UML) class diagram of a system for Wola integration with Spring framework is disclosed according to one embodiment. Each element in the UML diagram may identify a class name (e.g., <<interface>> Connection, CciTemplate, CciDaoSupport, etc.), the properties of that class (e.g., connectionFactory:ConnectionFactory, CciTemplate:CciTemplate, etc.), and the functions for that class (e.g., CciTemplate( ), CciTemplate(ConnectionFactory), ConnectWithWolaFunction( ), etc.).

As used herein, interface files are files that are templates/skeleton frames for inheriting classes to follow and fill out.

In FIG. 1, the following conventions are used. First, there are four types of relationship arrows used—a triangle with a solid arrow, a triangle with a dotted arrow, a carrot with a dotted arrow, and a solid triangle with a solid line. The triangle with a solid line indicates a concrete inheritance, which means the child is a concrete realization of the parent and is the physical code being run by the application. For example, WolaDao is the child and is the active code the application will use at run time.

The triangle with a dotted line is an indication of abstract inheritance, which means the class creates a body from the skeleton template of an interface.

The carrot with a dotted line implies usage, which means the pointed-at object exists inside the pointer entity. The pointer entity will then use the functionality of the pointed-at object.

The solid triangle with a solid line means the entities related to each other in the ratio denoted in the numbers above it.

The << >> tag indicate a stereotype, which highlights the relationship between the two files. The <<Uses>> means the pointer file contains the pointed-at file and utilizes its functionality. The <<Realize>> means the pointer file is create an actual body of code to the frame provided by the interface. The <<Specification>> means defines behavior of a component without defining how it internally works. For example, it contains the configuration settings and works the behavior of the connectionFactory, but does not influence the code of the connectionFactories.

In one embodiment, certain classes (e.g., <<interface>> connection, <<interface>> ConnectionFactory, <<interface>> ConnectionSpec, <<interface>> Record, and IndexedRecordImpl) may be standard Wola classes.

In one embodiment, certain classes (CciTemplate, CciDaoSupport, <<interface>> DaoSupport, and ConnectionSpecConnectionFactoryAdapter may be standard Spring classes.

In one embodiment, the outData:Converter class and the WolaInput: Converter class may bridge the conversion between application classes and the byte arrays used for Wola. The outData and WolaInput may work in a 1 to 1 association with the IndexedRecordImpl. The IndexedRecordImpl is the byte container structure used to hold the bytes before the bytes get sent through Wola. The outData and WolaInput are used to convert the byte array received from Wola back into Java understandable data primitives, and vice-versa.

In one embodiment, the outData and WolaInput are input and output containers based on the interaction of with the Wola. In one embodiment, outData and WolaInput may be data containers that may be mapped to particular objects in the input and output stream. The two streams may contain different sets of variables, which may require different containers.

In one embodiment, WolaJndiConfig:Configuration may be a user-defined class that may be responsible for retrieving a ConnectionFactory from the Websphere server. This factory may be used to retrieve connections to WOLA. In one embodiment, this class may also be responsible for creating a ConnectionSpec and providing it to the classes which will need it along with the ConnectionFactory.

In one embodiment, WolaDao:Repository may be a user-defined class that holds the parameters needed to exchange data with CICS. In one embodiment, it may call the function ConenctWithWola.

The commarea class may be generated using a COBOL copybook. This may allow Wola to map the input and output data exchanged between Java and CICS using the IndexedRecordImpl class.

The InteractionSpecImpl class may allow the developer to specify one or more CICS program to handle the request.

Figure 2:
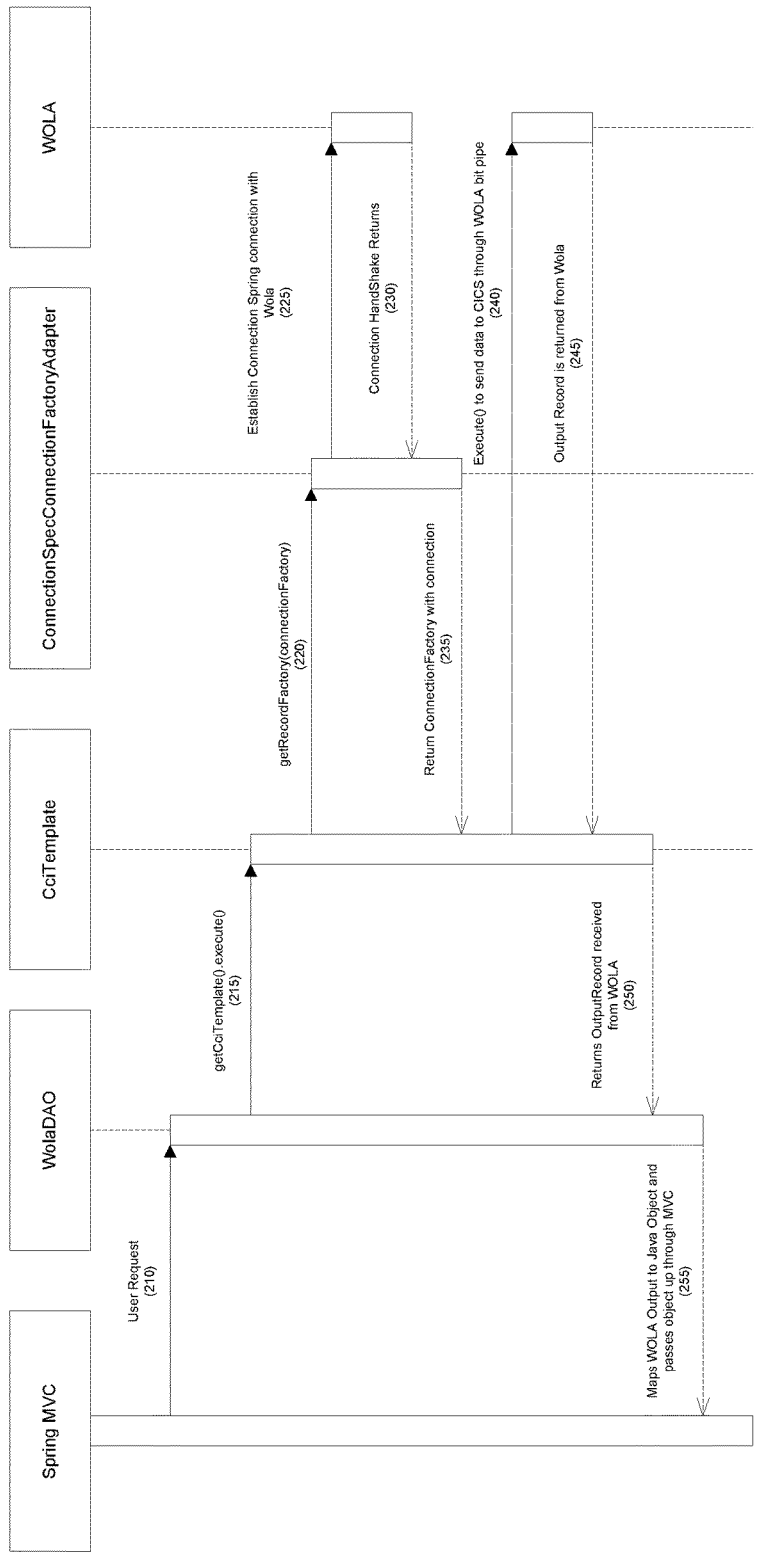
FIG. 2 depicts a method of processing a Java request in Spring Framework with Wola according to one embodiment.

Referring to FIG. 2, a method of processing a Java request in Spring Framework with Wola is provided according to one embodiment.

In step 210, a user may submit a request through the Spring Web model-view-controller (MVC) framework. In one embodiment, the request may be a web request from, for example, a browser.

In step 215, WolaDao may receive the request and may call the getCciTemplate( ).execute( ). In one embodiment, the execute( ) method may start the Java interaction with the Wola to send data to the CICS mainframe region. In one embodiment, an exemplary process is described with reference to FIG. 3.

Figure 3:
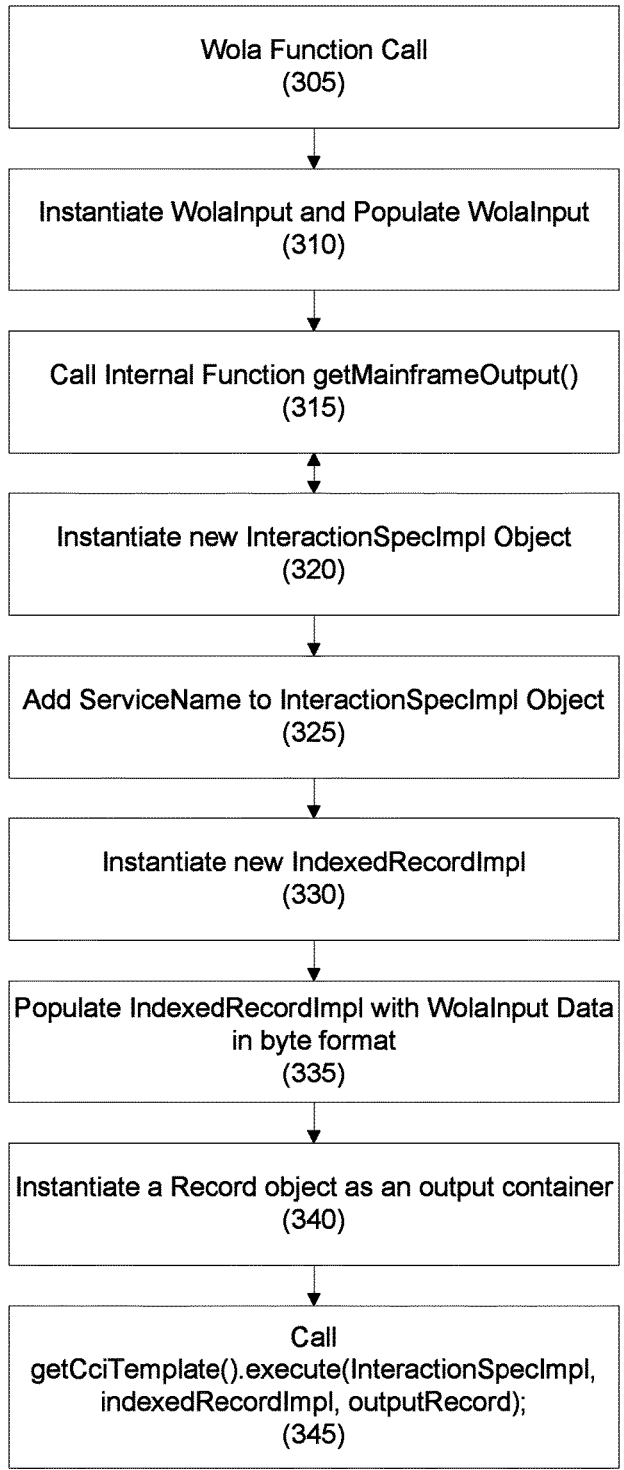
FIG. 3 depicts a logical flow diagram according to one embodiment.

Referring to FIG. 3, a logical flow diagram is provided according to one embodiment.

In step 305, a Wola function call is made. In one embodiment, this may be received from a Spring MVC framework.

In step 310, WolaInput may be instantiated and populated. In one embodiment, when a function call is invoked, the parameters required for the function call may be at least partly used to populate the WolaInput.

In step 315, getMainframeOutput( ) may be called. In one embodiment, getMainframeOutput is a method that contains the getCciTemplate( ).execute( ) may act as the common section among all WolaDao functions. In one embodiment, after all the details for each varying function have been established, they may run the same getMainframeOutput( )method to perform all necessary set of steps to send data through the Wola.

In step 320, a new InteractionSpecImpl object may be instantiated. In one embodiment, this object may specify the CICS program to process the request. The program name may be attached to the WolaInput while it is being populated.

In one embodiment, the program name may be determined in the development of the copybook used in the interaction.

In step 325, a ServiceName may be added to the InteractionSpecImpl object. In one embodiment, the service name may identify the CICS program that is executed after a connection to the mainframe is established. It may be provided to the application as a property or as a configuration file.

In step 330, a new IndexedRecordImpl object may be instantiated. For example, the IndexedRecordImpl contains a byte array, which will be filled with the bytes of the WolaInput In step 335, IndexedRecordImpl may be populated with WolaInput data in byte format. For example, Wola requires data to be transmitted using a byte stream. Thus, in one embodiment, the data is forced into byte format to be ready to be transmitted through Wola.

In step 340, a record object may be instantiated as an output container. For example, this may define the record object so that it can receive output data from the Wola, or Wola system.

In step 345, services getCciTemplate( ). execute(InteractionSpecImpl, indexedRecordImpl, outputRecord); may be called. In one embodiment, the InteractionSpecImpl object, IndexedRecordImpl, and OutputRecord that were created are used as inputs to connect with the Wola.

Referring again to FIG. 2, in step 220, the CciTemplate may call getRecordFactory (connection factory), which causes ConnectionSpecConnectionFactoryAdapter to establish Connection Spring connection with Wola.

In step 225, ConnectionSpecConnectionFactoryAdapter may establish a Spring connection with Wola.

In step 230, Wola may return a connection handshake to ConenctionSpecConnectionFactoryAdapter.

In step 235, ConenctionSpecConnectionFactoryAdapter may return ConnectionFactory with the connection for CciTemplate. In one embodiment, the ConnectionSpecConnectionFactoryAdapter may provide the connectionSpecs with the particular RecordFactory for the CciTemplate, so when using the CciTemplate, the proper connection details and Factory can be used to establish the connection needed.

In step 240, CciTemplate may execute the user request to send data to CICS through the Wola bit pipe. In addition, it may open and close connections without the user having to do so explicitly.

In step 245, Wola returns an output record to CciTemplate and, in step 250, CciTemplate returns the output record received from Wola to WolaDao.

In step 255, WolaDao may process the output record received from Wola and may, for example, map the Wola Output to a Java Object to pass it to the requesting application, such as browser in the Spring MVC framework. For example, in one embodiment, a byte array to may be loaded to outData generated class to convert the returned byte arrays to an application compatible data.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the IBM z/OS, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for integrating WebSphere Optimized Local Adapters (Wola) with Spring framework, comprising:
   in an information processing apparatus including at least a memory, a communication interface, and at least one computer processor:
   receiving a user request from a web model-view-controller framework;
   instantiating and populating a first data object based on the user request;
   instantiating and populating a second data object with data from the first data object in a byte format;
   instantiating an output record object as an output container;
   executing a service call to a Wola using the second data object and the output record object;
   establishing a connection with the Wola; and
   receiving the output record object from the Wola, the output record object populated with data from Wola.

2. The method of claim 1, wherein the first data object is a WolaInput data object.

3. The method of claim 1, wherein the second data object is a IndexedRecordImpl data object.

4. The method of claim 1, further comprising:
   instantiating a third data object that specifies a program to process the user request, wherein the third data object is included in the service call.

5. The method of claim 4, wherein the third data object is an InteractionSpecImpl object.

6. The method of claim 4, further comprising adding a service name to the third data object based on the program.

7. The method of claim 1, wherein the output record object is an outputRecord object.

8. A system for integrating WebSphere Optimized Local Adapters (Wola) with Spring framework, comprising:
   a server comprising:
   at least one computer processor;
   a memory;
   a first interface with a web model-view controller framework; and
   a second interface with a WebSphere Optimized Local Adapter;
   wherein the at least one computer processor performs the following:
   receive a user request from the web model-view-controller framework;
   instantiate and populate a first data object based on the user request;
   instantiate and populate a second data object with data from the first data object in a byte format;
   instantiate an output record object as an output container;
   execute a service call to a Wola using the second data object and the output record object;
   establish a connection with the Wola, and
   receive the output record object from the Wola, the output record object populated with data from Wola.

9. The system of claim 8, wherein the first data object is a WolaInput data object.

10. The system of claim 8, wherein the second data object is a IndexedRecordImpl data object.

11. The system of claim 8, further comprising:
    instantiating a third data object that specifies a program to process the user request, wherein the third data object is included in the service call.

12. The system of claim 11, wherein the third data object is an InteractionSpecImpl object.

13. The system of claim 11, further comprising adding a service name to the third data object based on the program.

14. The system of claim 8, wherein the output record object is an outputRecord object.

* * * * *